July 25, 1950  S. D. LESESNE  2,516,779
MULTI-PLY POWER TRANSMISSION BELT
Filed Dec. 22, 1945
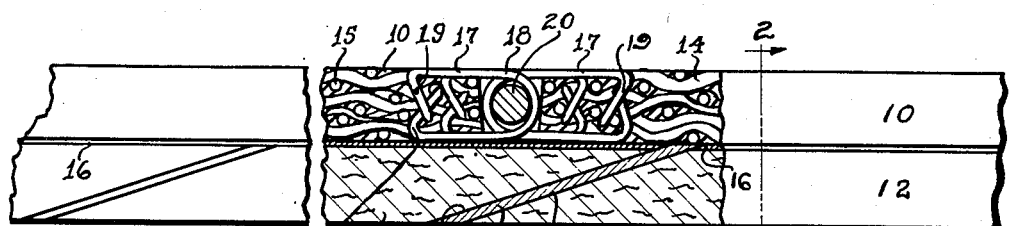
Fig. 1.
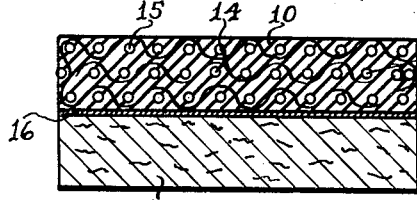
Fig. 2.
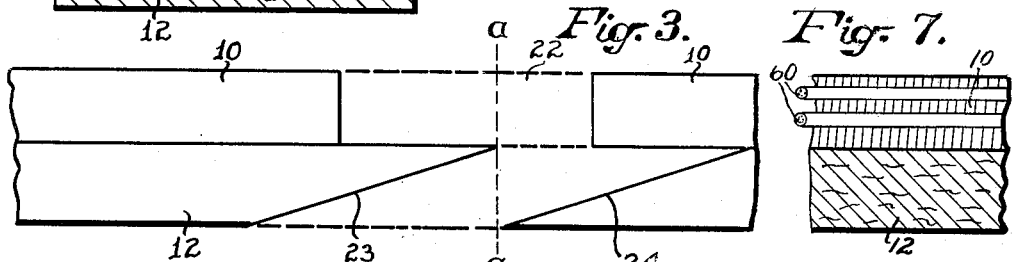
Fig. 3.   Fig. 7.
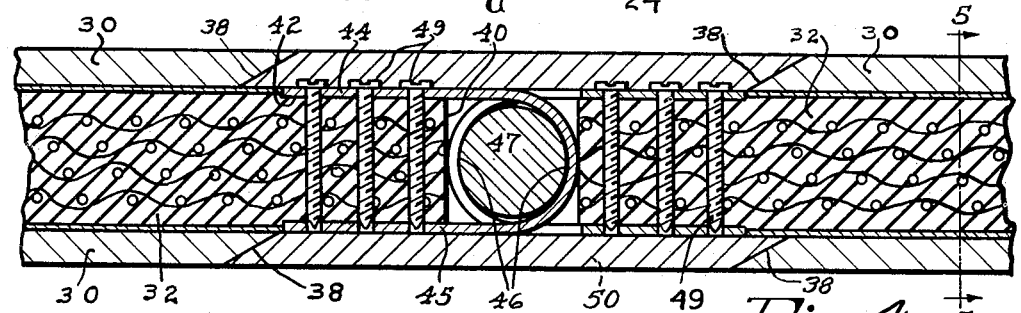
Fig. 4.
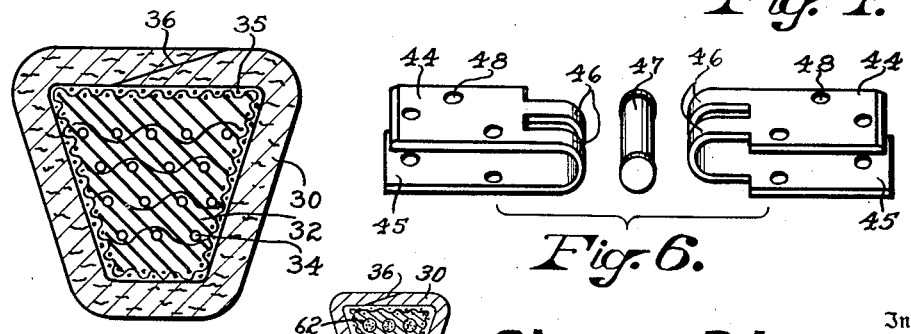
Fig. 5.   Fig. 6.
Fig. 8.
Inventor
Sherman D. Lesesne
By Clayton R. Jenks
Attorney Patented July 25, 1950

2,516,779

UNITED STATES PATENT OFFICE 2,516,779

MULTIPLY POWER TRANSMISSION BELT

Sherman D. Lesesne, Worcester, Mass., assignor to Graton & Knight Company, Worcester, Mass., a corporation of Massachusetts Application December 22, 1945, Serial No. 636,568

4 Claims. (Cl. 74—233)

This invention relates to power transmission belts and more particularly to a belt having a leather traction surface.

A flat or a V belt may have its traction portion reinforced by tension resisting cords or woven fabric carried in or cemented together by a plastic. I have reinforced a leather belt by means of fabric embedded in rubber and cemented to the leather. Some belt users require that belting be supplied in rolls or long strips and that an endless belt be made therefrom at the time of usage. It is customary to connect the ends of fabric reinforced rubber belts by means of U-shaped metal fasteners having hooks embedded in the rubber; but a multiple belt made of both leather and fabric reinforced rubber or other plastic renders the use of such fasteners impracticable. The rubber cemented fabric is strong and stiff and resists distortion, and the hooks of the fastener are held securely therein; whereas leather tends to give or to stretch where subjected to a localized stress, so that hooks may stretch the leather or pull it out of place. Any stretching of the leather portion or disengagement of the hooks tends to throw the major tensional effort on that side of the U-shaped fastener which is hooked into the rubberized fabric, and consequently the hooks are subjected to such a stress that they tend to break or the belt is otherwise injured.

The primary object of this invention is to overcome such problems and to provide a construction for a multiple layered leather and reinforced plastic belt which insures a permanent and proper fastening of the belt ends and provides a belt of long life and useful service.

Referring to the drawings illustrating two embodiments of this invention:

Fig. 1 is a longitudinal section through a flat belt having a traction layer of leather reinforced by a rubberized fabric backing;

Fig. 2 is a transverse section on the line 2—2 of Fig. 1;

Fig. 3 is a diagrammatic showing of how the belt is cut prior to joining the ends;

Fig. 4 is a longitudinal section through a V belt having a fabric reinforced rubber core and a traction layer of leather therearound;

Fig. 5 is a section on the line 5—5 of Fig. 4;

Fig. 6 is a detail showing in perspective the metal fasteners of Fig. 4 in a disassembled relationship;

Fig. 7 is a fragmentary longitudinal section showing a cord reinforcement in a flat belt; and Fig. 8 is a section, similar to Fig. 5, showing a cord reinforcement in a V belt.

In the construction of Figs. 1 and 2, I have illustrated a multi-ply flat belt made up of a layer 10 of rubberized fabric and a layer 12 of leather, and in which each of the layers of the belt is separately fastened to provide an endless structure of each like material. The leather portion 12 constitutes the driving face of the belt that engages the pulleys, and it may be suitably treated, as by currying, to give such characteristics as will satisfy that primary function. In order to prevent the leather layer from stretching permanently under the belt tensions of normal usage, I provide a reinforcement backing of rubberized fabric comprising one or more inner layers of fabric 14 and preferably an outer fabric wrapping 15 embedded in or cemented together by a suitable mastic, such as elastic rubber formed of either the natural or the synthetic material. This reinforced rubber portion may be made in accordance with various procedures and standard practice. The traction face of leather 12 is cemented to the rubber body by a suitable layer of cement 16, such as rubber cement, so that the parts constitute a unitary belt structure.

This material may be supplied in a roll or long strip greater than required for belting purposes, and at some subsequent time a required length is cut from the roll or strip and its two free ends are secured together in order to make an endless belt. This invention deals primarily with the manner of fastening these ends. That is, I fasten the leather ends together to make an endless strip, and I secure the rubberized fabric ends together independently of the leather portion of the belt, and yet the fabric and leather strips are secured together at their contiguous faces. To this end, I preferably cement the ends of the leather strip, and I employ a mechanical fastener to secure the ends of the fabric. The mechanical fastener for the rubberized fabric may be selected from various devices adapted for the purpose which will so connect the fabric ends that the major portion of the traction effort will be effected by the reinforced rubber backing. A suitable fastener, as illustrated in Fig. 1, may comprise U-shaped hooks 17 and 18 of different lengths which have prongs 19 bent backwards and arranged to hook into the body of the rubberized fabric. A set of these U-shaped hooks are hooked side by side in each end of the rubberized fabric and preferably with the short and long hooks in alternating arrangement, so that the hook ends 19 will not be too closely located. The loop portions of the hooks at one end of the belt strip are so located as to interfit between the hooks at the other end. A suitable locking pin, such as a piece of rawhide 20, is threaded through the interfitted loop ends of the hooks and thus forms a hinged pin which locks the parts together and yet permits a satisfactory flexing of the belt.

The leather facing of the belt is made of comparatively short strips of leather that have bevelled overlapping surfaces cemented together in accordance with standard practice; and this assembled layer of belt leather is in turn cemented to the rubberized fabric. In order to provide for manufacturing assembly of the belt parts, the desired length of belt may be cut from a long strip, and its free ends, originally in the line *a—a* of Fig. 3, are cut back as indicated by the dotted lines and preferably after the leather and fabric layers have been separated for a short distance. That is, the fabric ends are cut away, as represented by the dotted outlines 22; and the leather is skived or cut to form the parallel bevelled surfaces 23 and 24. The dimensions of the cut away portions are such that when the U-shaped hooks are inserted and locked in place, the two leather faces 23 and 24 will substantially meet. These bevelled faces are joined together by a suitable cement 25, such as cellulose nitrate plasticized with camphor or other plasticizing medium, after the fabric ends have been coupled. The cement and the shape and area of the bevelled faces are such that the junction of the two ends of the leather is sufficient to provide that strength which would be found in a standard leather belt of the same dimensions. Hence, the leather belt has the full strength required if it were used alone, and so it adds materially to the total strength of the belt. However, the reinforcement of fabric in the backing is such as to give the desired resistance to belt elongation, and thus this compound belt may be used for a long life without any material and permanent elongation.

In Figs. 4 and 5, I have shown how a V belt may be constructed to embody the principles of this invention. This type of belt comprises an outer traction layer 30 of leather and an inner body 32 of rubber carrying several layers of reinforcing woven fabric 34 and preferably a fabric layer 35 entirely surrounding the core. The outer layer 35 may be either concealed wholly within the rubber mastic or have its outer surface somewhat exposed, as is common in rubber belt structures. After the rubber belt with its inner and surrounding layers of fabric have been compounded, then the leather strip 30 is wrapped around the reinforced rubber core and its ends are cemented along the bevelled plane 36 in accordance with standard practice, such as by means of cellulose nitrate with a suitable plasticizer.

When a belt is to be made from a long strip of this assembled material, the required length is cut off and each end of the belt strip has its leather cut away, as indicated by the lines 38 in Fig. 4, so that there is an exposed rubber and fabric portion having ends 40 and exposed side portions 42. The exposed ends of the reinforced rubber core may now be secured together by clamps of the general type above described, or by a clamp of the type shown in Fig. 6. The clamp as illustrated comprises two U-shaped metal plates having flat plate portions 44 and 45 connected by two narrow loops 46 which are spaced apart by a slot and so arranged that they will interfit and receive a cylindrical pin 47 made preferably of a bronze alloy. Each of the plates is provided with holes 48 which may be threaded if desired to receive the ends of suitable screws 49 provided with tapered ends adapted to thread through the plate 44 and the reinforced rubber body and into threaded holes in the opposite plate 45 of the fastener. Thereafter, a leather strip 50 is wrapped around and cemented in place over the fasteners and core to conceal the fastening and to provide a belt having endless leather traction faces. These leather strips may be bevelled to overlap at their cemented ends.

In each of the above described constructions, there is an endless leather surface strip which provides the traction and friction face of the belt. This leather belt strip is reinforced by rubberized textile fabric made of cotton, rayon, nylon, or other suitable material, and the two ends of this fabric reinforcement are connected together to form an endless belt portion. Each of the layers, i. e., the leather and the textile reinforcement, is connected together and made endless wholly independently of the other portion of the belt, so that each performs its function without direct help from the other. At the same time, the two belt strips are cemented together so as to make an integral multi-ply belt.

The reinforcement is so made and connected that it is a strong tension resisting endless body that prevents the leather traction face of the belt from stretching or elongating materially under the normal belt usages. The reinforcement may be widely varied in its structure and characteristics. For example, I may supplement the fabric or replace it with reinforcing and tension resisting cords running lengthwise of the backing of Fig. 1 or of the core of Fig. 4. As shown in Fig. 7, a belt of the type shown in Figs. 1 and 2 may have parallel cords 60 embedded in the rubber matrix 10 and extending longitudinally of the belt. The V belt of Fig. 8 has longitudinal cords 62 embedded in the rubber body 32. These cords may be made of twisted textile material, such as cotton, rayon or nylon, or they may be made of other materials, such as glass filaments either in a twisted thread form or in parallelism, or they may be of flexible metal cable strands. The warp of the fabric extending longitudinally of the belt serves the same as an independent cord and is here construed as a cord. In each of these constructions, I prefer to employ the fabric wrapping 15 or 35 so as to provide an adequate holding medium which may be gripped properly by the hooks 19 of Fig. 1 or the screws 49 of Fig. 4. This fabric wrapping is strongly connected to the reinforcing cords by the intermediate cementing medium of vulcanized rubber or other suitable material so that the tensional stresses are properly transmitted from the longitudinal cords through the outer fabric wrapping. Also, the reinforcing cord may be slightly elastic so that it will travel properly around a pulley, but without imposing a severe stress on the leather. The elasticity of the rubber core in the V belt, for example, permits a slight lateral movement of the reinforcing cords or fabric as is required in making the turn, but the unchanging length of the cord or the longitudinal strands of the fabric prevents elongation of the leather.

Various modifications in this construction will now be readily apparent; hence this disclosure

I claim:

1. A flat multi-ply power transmission belt for traction pulleys comprising a reinforcement rubberized flat strip containing a layer of fabric extending from end to end thereof, a pivoted fastener secured to each of the ends of said strip and forming a flexible endless body, and a traction facing of leather cemented to the inner face of the rubberized fabric strip and having bevelled edges cemented together as an endless leather body which is located within and protects the reinforcement and its fastener from pulley wear and provides a continuous and the sole traction surface of the belt.

2. An endless V belt comprising a core of rubber, a reinforcement including cords embedded therein and extending from end to end thereof, a pivotal fastener mechanically connected to each of the free ends of the reinforcement and forming an endless body, and a facing of leather wrapped around and cemented to the core and concealing and protecting the pivotal fastener, said leather strip having its ends cemented together and being formed as an endless body independently of said fastener which provides a continuous traction surface.

3. An endless power transmission belt for traction pulleys comprising a reinforcing strip having free ends, a bendable mechanical fastener extending between and secured to each of the free ends which forms therewith an endless belt reinforcing strip, and a strip of leather having its ends cemented together and formed as an endless traction element, the mechanically fastened reinforcing strip being secured to the non-traction side of the leather strip and resisting stretch thereof and the leather strip providing a continuous uninterrupted traction face and protecting the fastener from pulley wear.

4. An endless power transmission belt for traction pulleys comprising an endless strip of leather having beveled end faces cemented together and arranged to form the sole traction face of the belt, a reinforcement strip having free ends and containing a reinforcing cord extending lengthwise thereof, a bendable mechanical fastening device secured to said free ends and connecting them together and forming an endless reinforcement for resisting stretch of the leather traction strip, and a cement connecting the adjacent faces of the leather and reinforcement strips, the leather strip providing a continuous traction face and protecting the fastener from wearing contact with the pulleys.

SHERMAN D. LESESNE.

REFERENCES CITED

The following references are of record in the file of this patent:

UNITED STATES PATENTS

| Number | Name | Date |
|---|---|---|
| 994,150 | Gilmer | June 6, 1911 |
| 1,203,859 | Duecker | Nov. 7, 1916 |
| 1,653,624 | Gingras | Dec. 27, 1927 |
| 2,158,007 | Ellis et al. | May 9, 1939 |

FOREIGN PATENTS

| Number | Country | Date |
|---|---|---|
| 10,649 | France | July 3, 1909 |
| 19,950 | Great Britain | of 1913 |
| 521,117 | Great Britain | May 13, 1940 |

Certificate of Correction

Patent No. 2,516,779 July 25, 1950

SHERMAN D. LESESNE

It is hereby certified that error appears in the printed specification of the above numbered patent requiring correction as follows:

Column 5, line 8, for the words "layer of fabric" read *reinforcing cord*; and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*